(12) United States Patent
Morgan

(10) Patent No.: US 6,286,553 B1
(45) Date of Patent: Sep. 11, 2001

(54) REMOVABLE CLOSURE SYSTEM

(75) Inventor: Mark A. Morgan, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 09/757,188

(22) Filed: Jan. 9, 2001

Related U.S. Application Data

(60) Provisional application No. 60/229,853, filed on Sep. 1, 2000.

(51) Int. Cl.[7] .................................................. F16L 55/16
(52) U.S. Cl. ............................. 138/89; 138/90; 220/315; 220/323
(58) Field of Search ........................ 138/89, 90, 92, 138/94, 96 R; 220/315, 323

(56) References Cited

U.S. PATENT DOCUMENTS

| | | | |
|---|---|---|---|
| 2,010,200 | 8/1935 | Rufener et al. | 220/57 |
| 2,281,145 | 4/1942 | Duey | 220/55 |
| 2,287,750 | 6/1942 | Clayton | 220/29 |
| 2,431,778 | 12/1947 | Sosaya | 138/89 |
| 2,512,041 | 6/1950 | Steele | 220/24.5 |
| 3,114,528 | 12/1963 | Forest | 248/158 |
| 3,155,116 | 11/1964 | Ver Nooy | 138/89 |
| 3,179,446 | 4/1965 | Paterson | 285/110 |
| 3,483,894 | 12/1969 | Finocchiaro | 138/90 |
| 3,765,456 | 10/1973 | Karpenko | 138/89 |
| 3,766,947 | 10/1973 | Osburn | 138/89 |
| 4,377,185 | 3/1983 | Katz | 138/90 |
| 4,387,740 | 6/1983 | Vanzant | 138/89 |
| 4,466,550 | 8/1984 | Sullivan | 220/206 |
| 4,576,778 | 3/1986 | Ferree et al. | 376/203 |
| 4,609,209 | 9/1986 | Ralls | 285/24 |
| 4,693,278 | 9/1987 | Wilson et al. | 138/89 |
| 4,775,074 * | 10/1988 | Ershig | 220/323 |
| 4,902,043 | 2/1990 | Zillig et al. | 285/4 |
| 5,035,266 | 7/1991 | Benson et al. | 138/92 |
| 5,038,830 | 8/1991 | Arnaud | 138/89 |
| 5,127,535 * | 7/1992 | Shinno | 220/323 |
| 5,437,309 | 8/1995 | Timmons | 138/89 |
| 5,450,765 | 9/1995 | Stover | 73/866.5 |
| 5,975,142 | 11/1999 | Wilson | 138/89 |

* cited by examiner

*Primary Examiner*—Patrick Brinson
(74) *Attorney, Agent, or Firm*—Head, Johnson & Kachigian

(57) ABSTRACT

A closure for an opening extending through a tubular member, the opening having a first cylindrical surface of a first internal diameter and a second cylindrical surface of an enlarged internal diameter providing a circumferential ledge, and, in the second cylindrical surface an increased internal diameter circumferential slot, the closure being formed of a cylindrical plug removably positioned within the tubular member and in engagement with the circumferential ledge and including an expandable snap ring having a collapsed and an expanded condition and receivable when in the expanded condition within the circumferential slot to capture the plug between the circumferential ledge and the snap ring. In one embodiment the snap ring is a unitary circumferential member having opposed, spaced apart first and second ends and wherein the snap ring is radially inwardly collapsed by moving the first and second ends towards each other. In another embodiment the snap ring is formed of first and a second leaf portions, each portion having a first end and a second end, each leaf portion being hinged to the plug body adjacent the first end thereof, the leaf portions being radially positioned by moving the second ends thereof towards or away from each other.

20 Claims, 13 Drawing Sheets

REMOVABLE CLOSURE SYSTEM

REFERENCE TO PENDING APPLICATIONS

This application is a conversion of U.S. Provisional Patent Application Ser. No. 60/229,853 filed Sep. 1, 2000 and entitled, "AN IMPROVED REMOVABLE CLOSURE SYSTEM".

REFERENCE TO MICROFICHE APPENDIX

This application is not related to any microfiche appendix.

BACKGROUND OF THE INVENTION

It is frequently necessary to close an opening in a tubular member either permanently or semi-permanently, that is, to close an opening where a valve is not required or is not desirable. One example of a semi-permanent closure arises when a hot tap is made into a pipeline or a vessel through a fitting connected to the pipeline or vessel. In the typical hot tapping application as utilized in the petroleum industry, a fitting usually in the form of a flange is welded on the exterior of a pipe that has flowing gas or liquid under pressure. A valve is then secured to the flange and a hot tapping machine secured to the valve. By use of highly specialized equipment, a hole can then be drilled through the wall of the pipe while a gas or liquid continues to flow through it to provide access to the interior of the pipe, such as for inserting equipment to temporarily block flow through the pipe while repairs are being made. After the repairs are complete the equipment is removed but the opening that provides communication to the interior of the pipe needs to be closed. Preferably the closure is made in such a way that at some future date access can be again obtained through the fitting to the interior of the pipe. This is just one example of the need for a closure for an opening in a tubular member.

For background information relating to closure devices, reference may be had to the following United States patents:

| U.S. PAT. NO. | INVENTOR | TITLE |
|---|---|---|
| 2,010,200 | Reufener et al. | Sealing Device for Pressure Containers |
| 2,281,145 | Duey | Pipe Plug |
| 2,287,750 | Clayton | Fill Pipe Cap |
| 2,431,778 | Sosaya | Test Cap |
| 2,512,041 | Steele | Temporary Drainpipe Closure |
| 3,114,528 | Forest | Base and Lock Assembly for Pipe |
| 3,155,116 | Ver Nooy | Apparatus for Closing Side Openings into Pipelines |
| 3,179,446 | Paterson | Extension Fitting Having Initial Flexible Lip Seal Gasket |
| 3,483,894 | Finocchiaro | High Pressure Pipe Test Plug |
| 3,765,456 | Karpenko | Chemical Cleaning Line Connector |
| 3,766,947 | Osburn | Fluid Tight Closure |
| 4,377,185 | Katz | Hydrotest Apparatus |
| 4,387,740 | Vanzant | Cam-Flange |
| 4,466,550 | Sullivan | Closure for a Cylindrical Opening Having Improved Venting Means |
| 4,576,778 | Ferree et al. | Core Barrel Plug |
| 4,609,209 | Ralls | Precise Alignment Adapter Flange |
| 4,693,278 | Wilson et al. | Safety Closure Member |
| 4,902,043 | Zillig et al. | Fluid Coupling and Seal Assembly |
| 5,035,266 | Benson et at. | Mechanical Plug for Clean-Out Tees |
| 5,038,830 | Arnaud | Pipe and Sealing Device |
| 5,437,309 | Timmons | Lockable Well Cap |
| 5,450,765 | Stover | Apparatus for Providing Signal Communication Between the Interior and Exterior of a Pipeline |
| 5,975,142 | Wilson | Removable Closure System |

BRIEF SUMMARY OF THE INVENTION

This invention provides a removable closure including a tubular member having a cylindrical opening for the passage of tools or for flow of liquids or gases. In a typical application of the invention the closure may be in the form of a flange member, that is, a tubular member that has an integral radially extending flange portion that is readily adaptable for the attachment of other structural or piping devices. The tubular member has an inner end and an outer end and an internal passageway that is defined by a first cylindrical surface of a first internal diameter adjacent the inner end and a second cylindrical surface of a larger internal diameter adjacent the outer end, the difference in internal diameters providing a circumferential ledge. The tubular member second cylindrical surface has an increased internal diameter circumferential slot therein that is spaced from the circumferential ledge.

A cylindrical plug is positioned within the tubular member. The plug has an external diameter greater than the diameter of the tubular member first cylindrical surface and slightly less than the diameter of the second cylindrical surface. The cylindrical plug is thereby telescopically positionable within the tubular member second internal cylindrical surface and in engagement with the circumferential ledge.

An expandable snap ring is secured to an upper surface of the cylindrical plug and has a collapsed and an expanded condition. When in the collapsed condition the snap ring has an external cylindrical diameter less than the diameter of the tubular member second internal cylindrical surface. In its expanded condition, the snap ring fits into the tubular member circumferential slot so that the cylindrical plug is captured between the circumferential ledge and the snap ring.

A link plate is supported on the cylindrical plug and in a plane of the snap ring and within the snap ring. The snap ring has a gap therein providing snap ring opposed outer ends. Links extending from the link plate to the snap ring outer ends serve to expand the snap ring when the link plate is moved radially outwardly and to contract the external dimension of the snap ring when the link plate is moved radially inwardly.

A cam is utilized to radially inwardly or outwardly displace the link plate and thereby expand or contract the outer circumferential dimension of the snap ring to move it positively into or out of the circumferential slot in the tubular member.

When the link plate is in its outer position and the snap ring within the circumferential slot, a keeper in the form of a bolt may be threaded through the link plate and into the top surface of the plug so that the snap ring is positively retained in its outward most position to retain the plug in position within the tubular member.

In a second embodiment the snap ring is formed of a first and a second leaf portion. Each leaf portion having an outer end and an inner end. Each leaf portion is hinged to the plug body adjacent the leaf portion inner end. A linkage mechanism is secured to the outer end of each of the leaf portions. By actuation of the linage mechanism in one direction the leaf portions are moved radially outwardly with respect to each other to extend within the tubular member circumferential slot to lock the cylindrical plug within the tubular member. By actuation of the linkage mechanism in an opposite direction the leaf portions are moved radially inwardly with respect to each other to withdraw the leaf portions from the tubular member circumferential slot to permit the plug member to be removed from within the tubular member.

A better understanding of the invention will be obtained from the following description of the preferred embodiments and the claims, taken in conjunction with the attached drawings.

DESCRIPTION OF THE DRAWINGS

FIG. 1 shows a flange having a passageway therethrough and positioned within the passageway a cylindrical plug, a snap ring and a keeper plate by which the passageway is closed against the passage of liquids or gases.

FIG. 9 illustrates the appearance of the invention after the plug has been installed within a flange and the plug holder removed from it. In the normal practice, a blind flange plate (not seen) is used to close the top of the flange so that the plug permanently remains in the flange unless there is necessity for it to be removed.

FIG. 10 illustrates first and second retainer leaves in their withdrawn or collapsed condition as occurs when the plug is in condition to be inserted into or removed from a flange.

FIG. 12 shows the plug holder removed from the plug member.

FIG. 14 shows the plug member within the flange and with the plug holder attached to the plug member. The difference between FIGS. 12 and 14 is that FIG. 14 shows the plug bolder attached while FIG. 12 shows the plug holder removed.

In FIG. 16 the pressure relief system is of the type shown in FIG. 15.

DETAILED DESCRIPTION OF THE PREFERRED EMBODIMENTS

Figure 1:
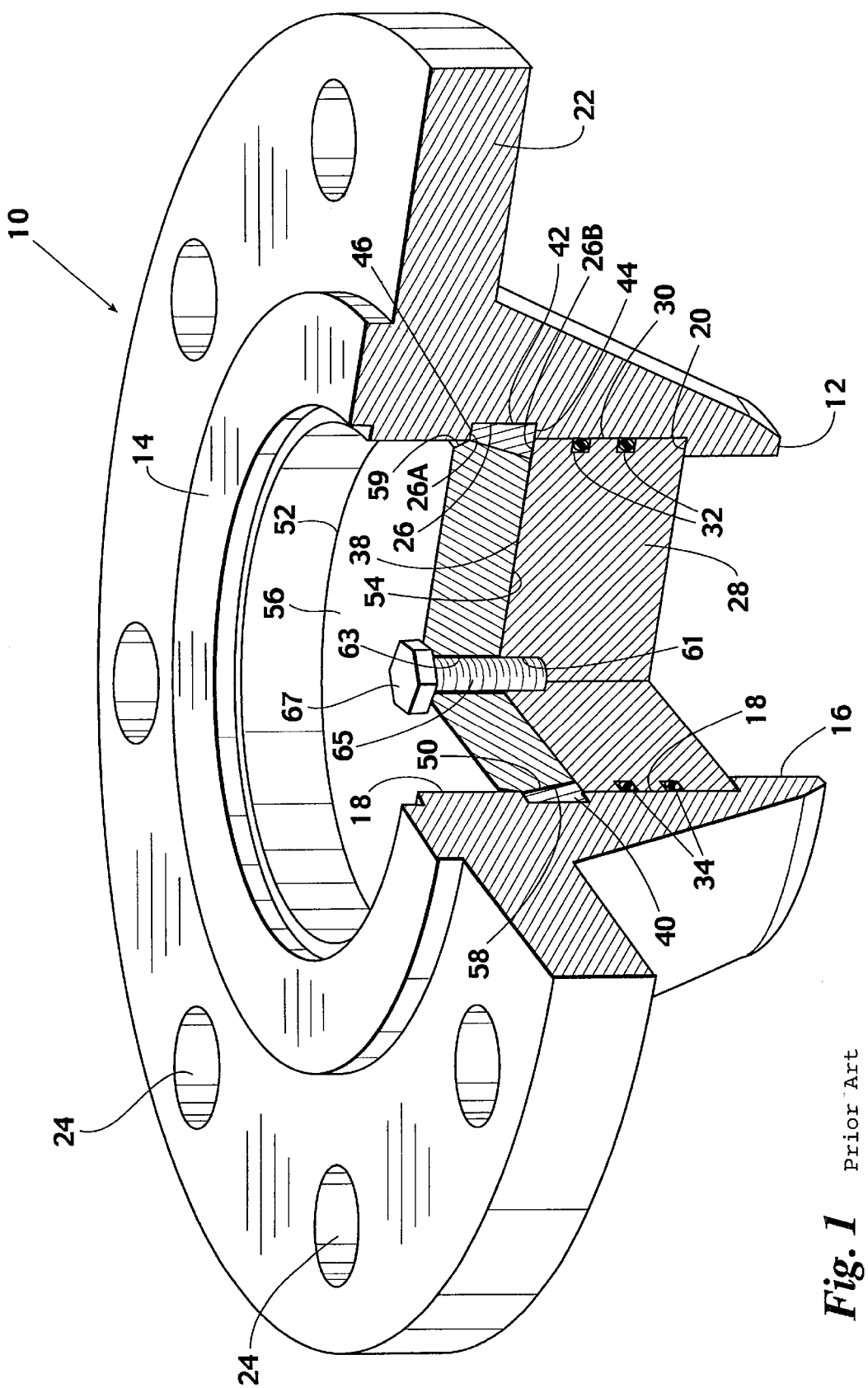
FIG. 1 is an isometric elevational view, shown cut away, of a tubular member in the form of a flange and showing a closure system. Specifically.
Figure 2:
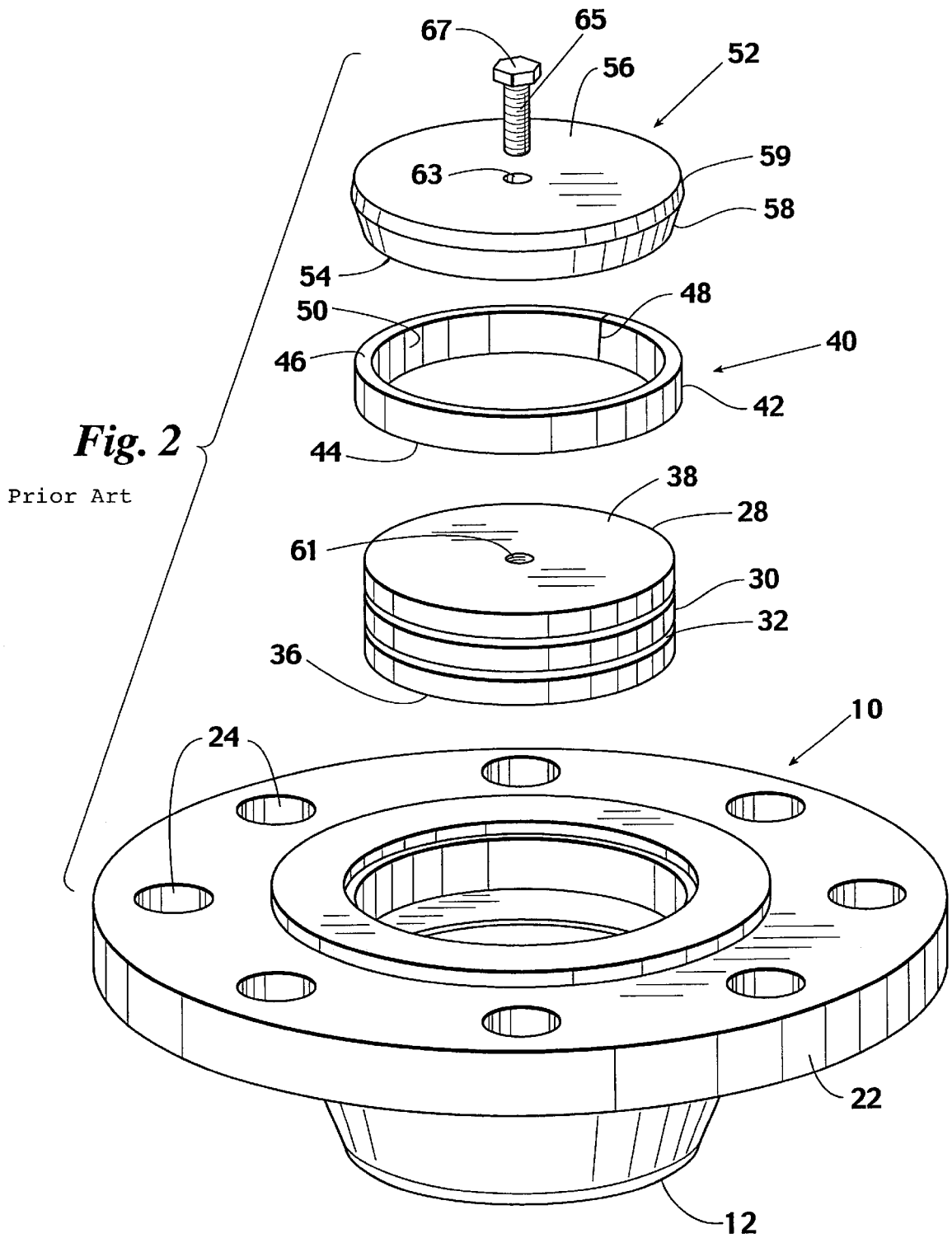
FIG. 2 is an isometric exploded view of the prior art removable closure system of FIG. 1 showing the basic components having been removed from the interior of the tubular flange member.

Referring to the drawings, and first to FIGS. 1 and 2, a removable closure system representative of the prior art is illustrated as applicable to close a flange fitting generally indicated by the numeral 10. A "flange" is a commonly employed piping fitting frequently utilized in the piping industry, including the petroleum and petrochemical industries. The invention herein is not limited in use only to a flange but is a system for removably closing a tubular member, flange 10 being an example of a tubular member and is illustrated herein only because it is a typical environment for the application of the closure system of this invention. Flange 10 has an inner end 12 and an outer end 14. Inner end 12 is shown of the type that is particularly configured for welding to the end of a length of pipe or to other equipment. Flange 10 has an opening therethrough defined by a first internal cylindrical surface 16 and a second internal cylindrical surface 18. Second cylindrical surface 18 is of enlarged internal diameter compared to first cylindrical surface 16 providing a circumferential ledge 20.

Flange 10 illustrated as an example of a tubular member has an integral radially extending flange portion 22 with openings 24 therein by which another flange or other apparatus may be secured to it, it being understood that the radial flange portion 22 is not material to this invention.

Other features of flange 10 are illustrated as are typical of this type of device but are not important to the invention. The only elements of flange 10 that are important is the passageway defined by first cylindrical surface 16, second cylindrical surface 18, circumferential ledge 20 and an increased internal diameter circumferential slot 26 formed in second cylindrical surface 18, slot 26 having a planar top end surface 26A and an opposed, paralleled, bottom end surface 26B.

To removably close the opening through flange 10 a cylindrical plug 28 is employed. Plug 28 has an external cylindrical surface 30 that is larger than flange first cylindrical surface 16 and slightly less in diameter than flange second cylindrical surface 18 so that plug 28 is telescopically positionable within the opening in the flange and rests upon circumferential ledge 20.

To seal against the passage of liquids or gases through the flange, plug 28 is illustrated to have two spaced apart circumferential grooves 32, each of which receives an O-ring or other form of gasket 34. In FIG. 2 grooves 32 are shown in the external cylindrical surface 30 of plug 28 but the O-rings are not shown. While two grooves 32 and O-rings 34 are shown only one may be employed and other types of seals may be employed to prevent leakage through the closed passageway.

Plug 28 has a bottom surface 36, the outer circumferential edge of which rests on circumferential ledge 20, and a top surface 38.

In order to retain plug 28 in position within the flange an expandable snap ring, generally indicated by the numeral 40, is employed. Snap ring 40 is toroidal having an external cylindrical surface 42, a bottom end 44 and a top end 46. Snap ring 40 is dimensioned to be received within circumferential slot 26 between the slot end surfaces 26A and 26B when the snap ring is radially outwardly extended to its expanded condition. In FIG. 2 snap ring 40 is shown in its normal, collapsed condition, that is, wherein the slit 48 formed in the snap ring is closed or at least substantially closed. Snap ring 40 can be radially outwardly expanded to move into circumferential slot 26. Radially outwardly expansion increases the width of slit 48.

Snap ring 40 has an internal circumferential surface 50 that is frusto-conical. The frusto-conical surface 50 tapers downwardly and inwardly to a reduced internal circumferential diameter at the snap ring bottom end 44.

In order to radially outwardly expand snap ring 40 and to maintain the snap ring in its expanded condition, a keeper plate 52 is employed. Keeper plate 52 has a bottom surface 54 and a top surface 56, both of which are preferably planar. Keeper plate 52 is dimensioned to be telescopically positionable within flange passageway second cylindrical surface 18 and has an external circumferential surface defined primarily by a frusto-conical surface 58. The frusto-conical surface 58 terminates at its upper end, that is, at the keeper top surface 56 by a circumferential bevel 59, however, bevel 59 is not critical or important and bevel 59 may be eliminated with the frusto-conical surface 58 extending all the way to keeper top surface 56. Instead of circumferential bevel 59, a short height cylindrical surface of external diameter slightly less than the diameter of flange second cylindrical surface 18 may be employed.

The interrelationship between keeper plate external frusto-conical surface 58 and snap ring internal frusto-conical surface 50 is important. A fundamental purpose of keeper plate 52 is to maintain snap ring 40 in its expanded condition within circumferential slot 26. In addition to maintaining the snap ring in its expanded condition to thereby keep plug captured within the flange, keeper plate 52 is also important in the installation of the closure system within the flange. As previously stated, in the preferred embodiment snap ring 40 is, when in its normal condition, collapsed as illustrated in FIG. 2. When the closure system is assembled, plug 28 is first positioned within the flange followed by positioning snap ring 40 on plug upper surface 38. Since the snap ring in its collapsed condition has an external cylindrical surface of a diameter less than flange second internal surface 18 it is easily positionable within the flange. In order to expand the snap ring within circumferential slot 26, keeper plate 52 is placed on top of the snap ring and the plate is then forced downwardly towards plug 28. The interaction of external frusto-conical surface 58 of keeper plate 52 with snap ring internal frusto-conical surface 50 causes the snap ring to radially outwardly expand into circumferential slot 26 as illustrated in FIG. 1.

When a workmen desires to open the passageway through flange 10, keeper plate 52 is removed from within snap ring 40 and the natural resilient memory of the snap ring causes it to collapse to its minimum external diameter condition thereby withdrawing or at least substantially withdrawing the snap ring from circumferential slot 26. If the snap ring does not fully withdraw from the circumferential slot at least the withdrawal will be sufficient that by means of pliers or other tools, the snap ring can be fully extracted from the slot and thereby removed from within the flange permitting the subsequent removal of plug 28.

The action of snap ring 40 is opposite to the action of a typical snap ring placed in an internal circumferential slot in that typical snap rings are biased to radially expand outwardly and must be compressed against natural resilience in order to permit the typical snap ring to be removed from an internal circumferential slot. Since snap ring 40 functions contrary to the typical snap ring, keeper plate 52 is imperative in the operation of the closure system.

One way of maintaining the keeper plate in contact with the internal circumferential surface of the snap ring is illustrated in the drawings in which plug 28 has a threaded recess 61 and keeper plate 52 has an opening 63 in alignment with recess 61. A threaded bolt 65 extends through opening 63 and is threaded into threaded recess 61, the head 67 of the bolt serving to maintain the keeper plate in fixed position with respect to plug 28 and thereby to maintain the keeper plate within snap ring 40. In the illustrated and preferred arrangement, the snap ring and keeper plate are dimensioned so that when the keeper plate is in contact with the top surface 38 of plug 28, snap ring 40 is fully radially outwardly positioned within circumferential slot 26.

To open the closure in flange 10 a workmen first removes bolt 65 by applying a wrench to head 67. Keeper plate 52 may then be removed from within snap ring 40, permitting the snap ring to contract to its natural condition by which it withdraws, or at least substantially withdraws from circumferential slot 26. After the snap ring is removed, plug 28 may then be removed. To augment removal of keeper plate 52 threaded recesses (not shown) may be provided in the top surface 56 to receive bolts for use in attaching tools to extract the keeper plate and once the keeper plate is extracted, bolt 65 can be reinserted into threaded recess 61 to aid in the removal of plug 28.

Figure 3:
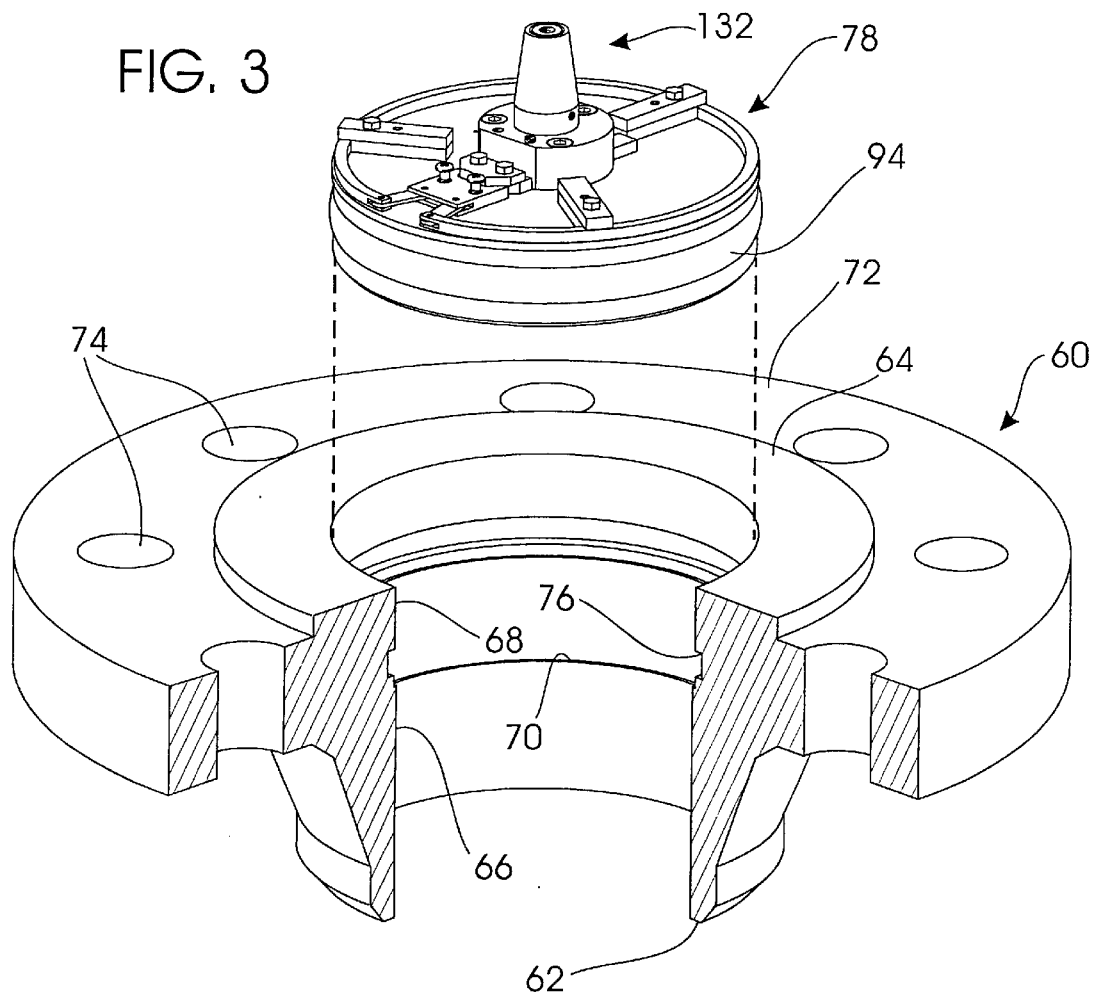
FIG. 3 is an exploded view of an improved system that includes a plug insertable into the opening through a flange for removably closing the flange.

FIGS. 3–9 of the drawings shows an embodiment of the invention in which a snap ring that holds the plug in position is positively expanded or retracted in a different way compared to the prior art system illustrated in FIGS. 1 and 2. Referring first to FIG. 3 the basic components of the removable closure system are illustrated. A tubular member in the form of a flange generally indicated by the numeral 60 has an inner end 62 and an outer end 64. A passageway is formed through the flange, the passageway being defined by a first cylindrical surface 66 and a slightly enlarged second cylindrical surface 68. Since second cylindrical surface 68 is of larger internal diameter than first cylindrical surface 68 an internal circumferential ledge 70 is formed in the passageway.

Flange 60 typically has an integral radially extending flange portion 72 having bolt opening 74 therein. However the invention is applicable to any type of tubular device that needs to be removably closed.

Formed in the second cylindrical surface 68 of the flange above ledge 70 is an increased diameter circumferential groove 76.

A plug member generally indicated by the numeral 78 is used to removably close the interior of flange 60. The plug member, shown in cross-sectional view in FIG. 4, includes a first external cylindrical surface 80 and a second, increased external diameter cylindrical surface 82, the difference in the diameters of surfaces 80 and 82 providing an external circumferential ledge 84. The external diameter of first cylindrical surface 80 is slightly less than the internal diameter of the flange first cylindrical surface 66 and in like manner, the external diameter of the plug second cylindrical surface 82 is slightly less than the internal diameter of the plug second cylindrical surface 68. Thus the plug body 86 can be positioned within the interior of flange 60 with the plug external cylindrical ledge 84 resting on the plug internal circumferential ledge 70.

Plug body 86 has a lower surface 88 and a top surface 90. Intermediate the top and bottom surfaces and below ledge 84, is an external circumferential groove 92 that receives an elastomeric gasket or seal that is preferably in the form of an O-ring, that is an elastomeric toroid 94. When plug 78 is placed in flange 60 elastomeric toroid 94 serves to seal the passageway through the flange against the escape of fluids, either liquids or gases. Plug body 86 has, in communication with the lower surface 88, an opening 96. In axial alignment with this larger opening is a smaller diameter opening 98 that communicates with a cup recess 100 that communicates with the plug body top surface 90. The difference in diameter between openings 96 and 98 provides a circumferential valve seat surface 102. A ball valve 104 is positioned in larger opening 96. Below ball valve 104 is a compression spring 106 held in place by means of a keeper 108 that fits in a short length circumferential groove in opening 96. Spring 106 urges ball valve 104 towards a closed position in which the ball is seated against the valve seat surface 102. When seated, the passage of fluid upwardly past the plug 78 is prevented but when ball valve 104 is displaced downwardly, as illustrated in FIG. 4, fluids and/or gases can pass upwardly through opening 98 to thereby equalize any pressure across the plug.

Figure 5:
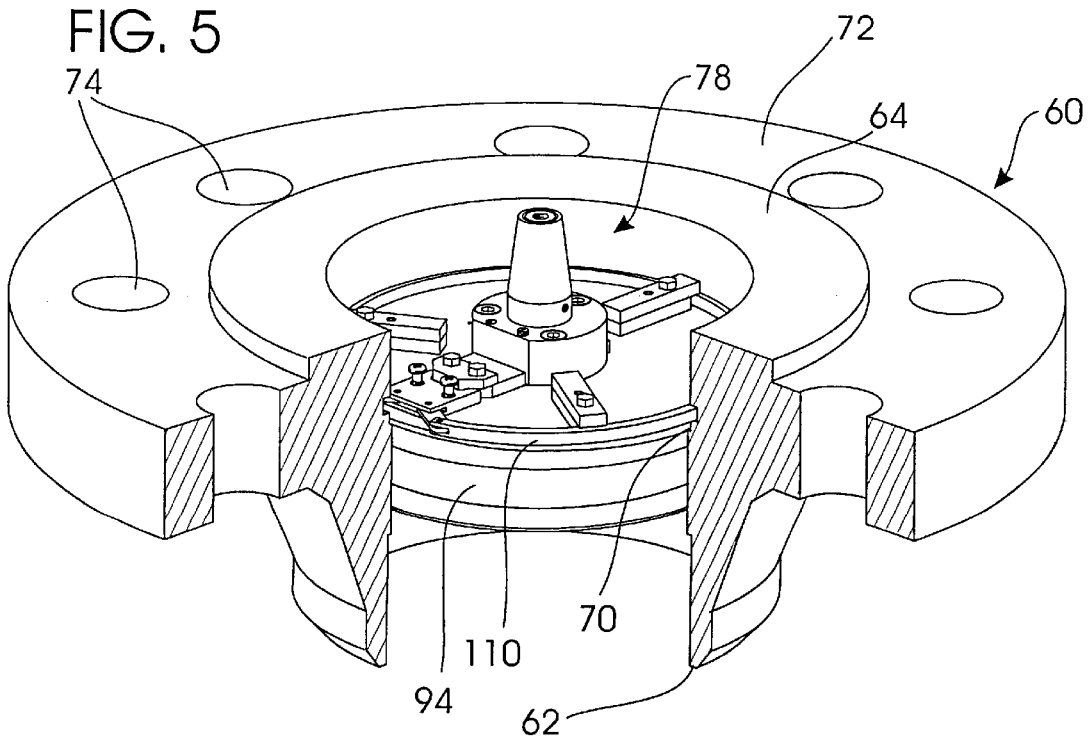
FIG. 5 is an isometric view of a tubular member in the form of a flange, and showing the plug as illustrated in FIGS. 3 and 4 inserted into the flange and locked in position.
Figure 6:
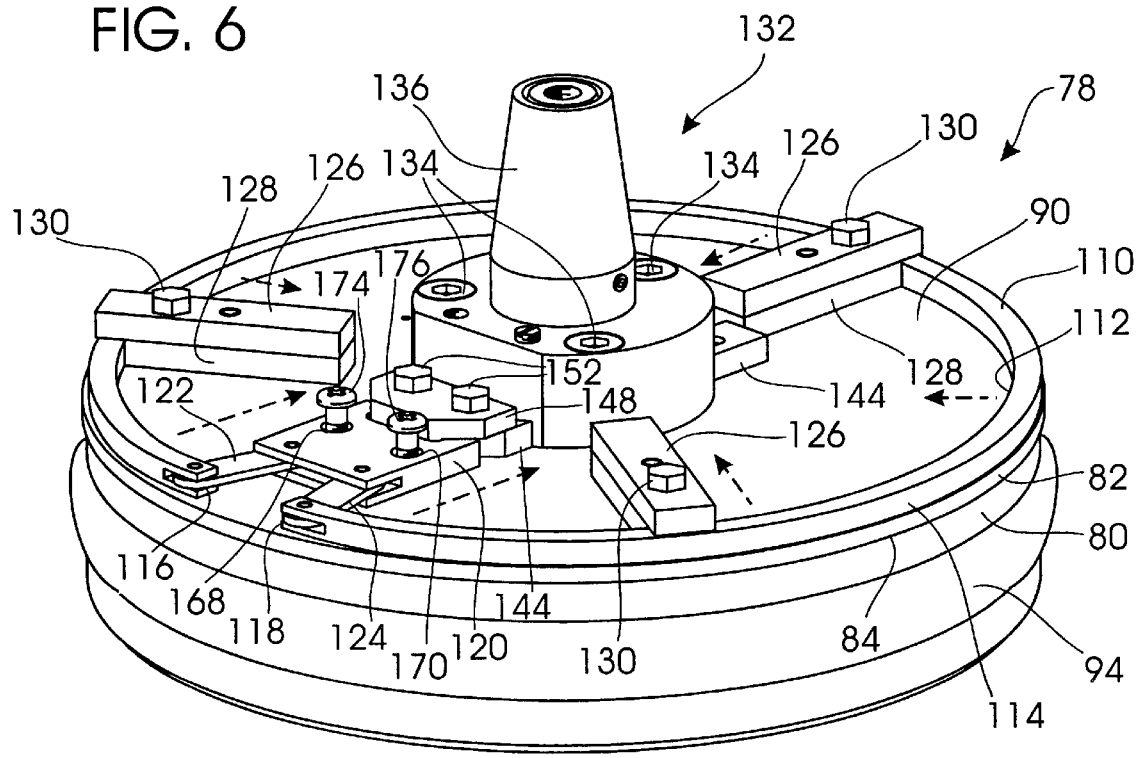
FIG. 6 is an isometric view of the plug as shown in FIG. 4 and shows the plug in condition in which the lock ring is withdrawn to a reduced external circumferential diameter in the state in which the plug is inserted into or removed from a tubular member.
Figure 7:
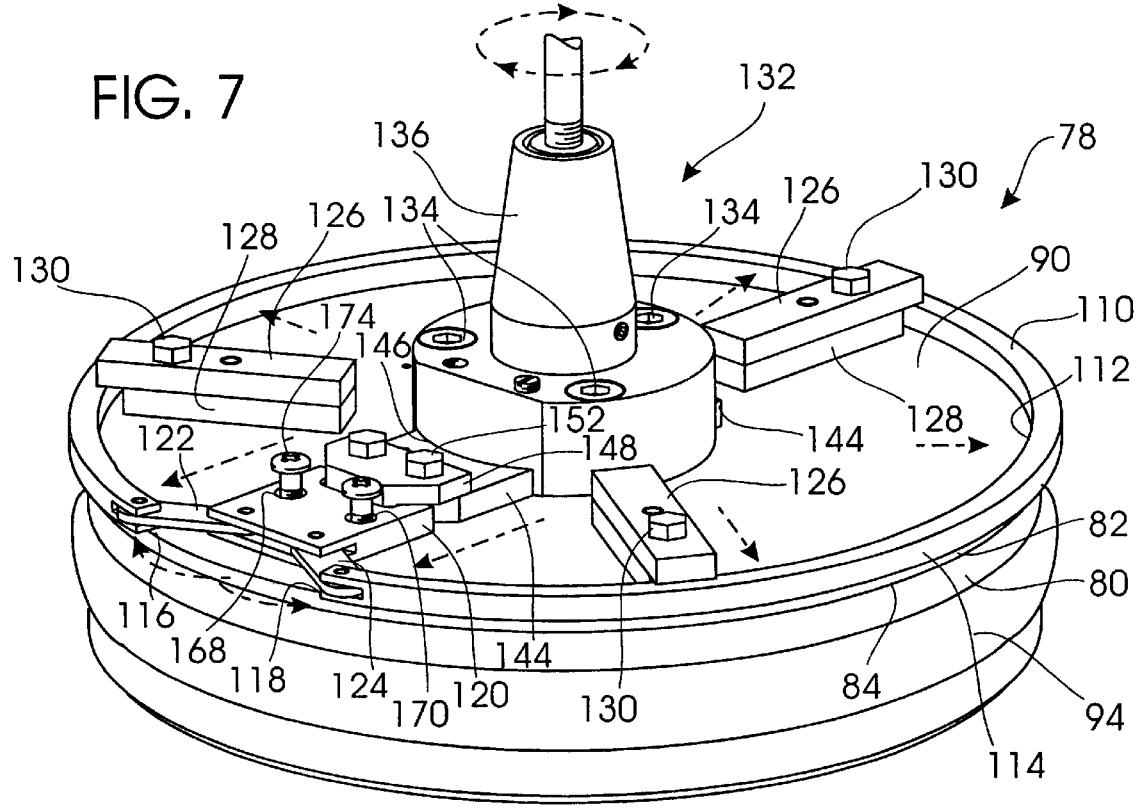
FIG. 7 is an isometric view as in FIG. 6 but shows the condition in which the lock ring is radially expanded to an increased external circumferential diameter by which the plug is locked into position within a tubular member.

A snap ring element 110 is used to hold plug 78 in position within flange 60. The action of the snap ring is best illustrated in FIGS. 5, 6 and 7. Snap ring 110 is a toroidal member of square or rectangular cross-sectional configuration, a squared cross-sectional configuration being illustrated in the drawings, and has an internal circumferential surface 112 and an external circumferential surface 114. Snap ring 110 has a gap providing a first end 116 and a second end 118 the ends being spaced apart from each other. When the gap between ends 116 and 118 is narrowed the external diameter of circumferential surface 114 of the snap ring is retracted or reduced so that the external diameter is less than the internal diameter of flange second cylindrical surface 68. Thereby plug 78 can be inserted into or removed from within flange 60. On the other hand, when the space between ends 116 and 118 is increased, as shown in FIG. 7, the external diameter of circumferential surface 114 of the snap ring increases so that it is greater than the internal diameter of the plug second cylindrical surface 68. The external diameter of the snap ring can be increased greater than the internal diameter of the plug second cylindrical surface 68 only when the snap ring is free to pass into the circumferential groove 76. With snap ring 110 positioned within groove 76 as shown in FIG. 5 the upper portion of plug 78 is captured between internal circumferential ledge 70 and the snap ring so that the plug is firmly held in position within flange 60. The mechanisms used to radially expand and contract snap ring 110 can be generally characterized as a linkage mechanism. As illustrated in FIGS. 6 and 7, the expanded or contracted condition of snap ring 110 is controlled by a link plate 120. A first link 122 is pivotally connected between snap ring first end 116 and link plate 122 and second link 124 in like manner connects the second end 118 of the snap ring to the link plate. When link plate 120 is radially outwardly displaced as shown by the arrows in FIG. 7 snap ring 110 is expanded in diameter so that it can, when plug 78 is in position within the flange, extend within the flange groove. On the other hand, when link plate 120 is retracted radially inwardly as shown by arrows in FIG. 6, the external diameter of the snap ring is reduced, retracting the snap ring from within the groove and permitting the plug to be removed from the flange.

As illustrated in FIGS. 6 and 7, the snap ring is held in position on plug body top surface 90 by means of guides 126, three guides being shown. Each guide is spaced from plug body top surface 90 by a spacer 128 that is slightly greater in thickness than snap ring 110 so snap ring is free to move. The guides 126 and spacers 128 are held in position on plug body top surface 90 by means of bolts 130. Guides 126 and spacers 128 could each be easily made of a single part.

Figure 4:
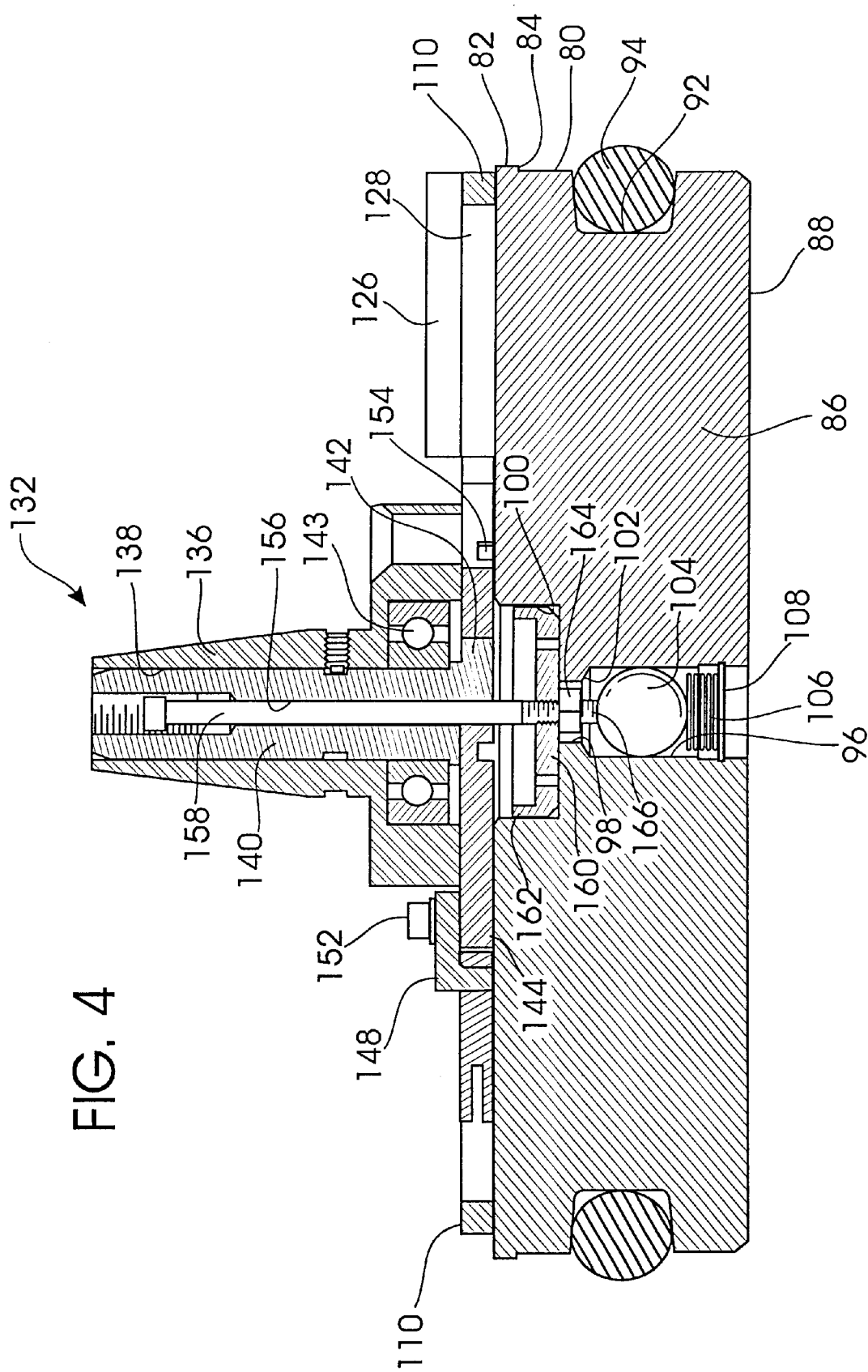
FIG. 4 is an enlarged elevational cross-sectional view of the improved plug system as shown in FIG. 3 and shows the use of a holder by which as plug is inserted into a tubular member and locked into position.
Figure 8:
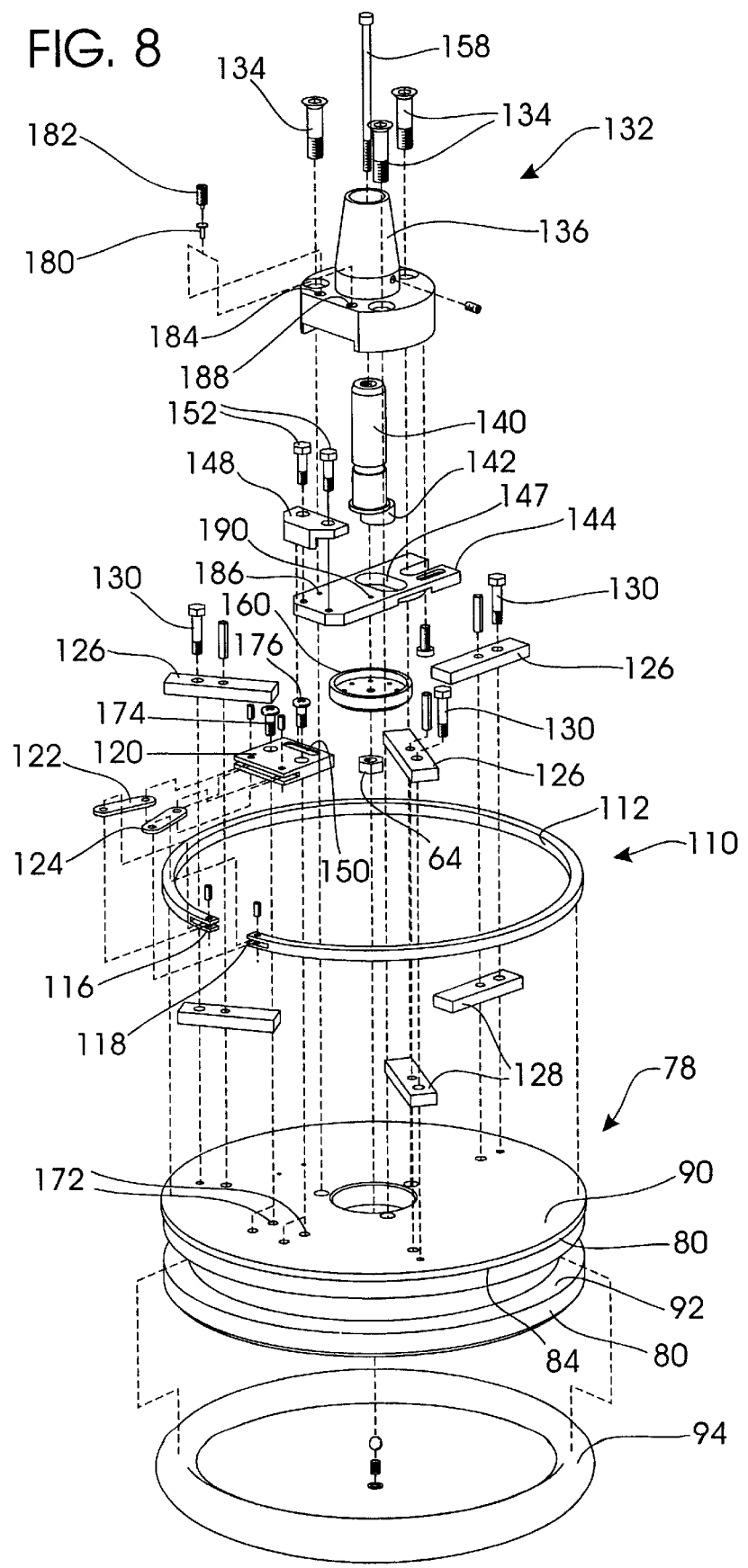
FIG. 8 is an exploded view showing more details of the components making up the plug as illustrated in FIGS. 3 through 7 and the plug holder by which the plug is inserted into a tubular member and by which the plug is locked in position.

FIG. 4 taken with FIGS. 6, 7 and 8 illustrate the mechanisms by which link plate 120 is radially inwardly and outwardly positioned to expand and contract snap ring 110. Removably attached to the top surface 90 of the plug body is a plug holder generally indicated by the numeral 132, the plug holder being attached by screws 134. A vertical opening 138 (see FIG. 4) extends through plug holder body 136 and rotatably receives a cam-shaft 140 that has, on the lower end thereof, an integral eccentric cam-portion 142. A yoke 144 is slidably positioned in a slot 146 in the bottom surface of plug holder body 136. Yoke 144 has an elongated slot 147 that receives the cam-shaft cam-portion 142 so that rotation of the cam-shaft 140 reciprocally displaces yoke 144. The outer end of yoke 144 has attached to it a linkage member 148, the linkage member having a downwardly extending portion that fits in a slot 150 in link plate 120. Linkage member 148 is held to yoke 144 by bolts 152.

As seen in FIG. 4, yoke 144 that functions in expanding and contracting snap ring 110 has, in the lower surface thereof, semi-circular grooves 154. Axially displacably received within a vertical opening 156 in cam-shaft 140 that is within plug holder body 136 is a stem 158. The lower end of stem 158 is threaded and receives a safety lock 160 that is cup shaped so that it has a circumferential upstanding lip 162. Safety lock 160 is received in cup recess 100. When yoke 144 is radially outwardly advanced by the rotational position of cam-portion 142, safety lock 160 can rise so that circumferential lip 162 extends within circumferential groove 154 in the yoke allowing stem 158 to a full upward position. Safety lock 160 is held to stem 158 by a nut 164 and a portion 166 of the stem extends below the nut. When stem lower end portion 166 is downwardly depressed and the lip 162 is out of groove 154 and therefore below yoke 144 stem lower end portion 166 engages ball valve 104 (as seen in FIG. 4) pressing it downwardly against spring 106 so that a pressure equalizing vent through plug body 86 is provided.

This means that ball valve 104 can be in a closed position only when safety lock 160 is in the full upward position meaning that yoke 144 is radially outwardly expanded with snap ring 110 in groove 76, securely locking the plug within the flange 60.

Figure 9:
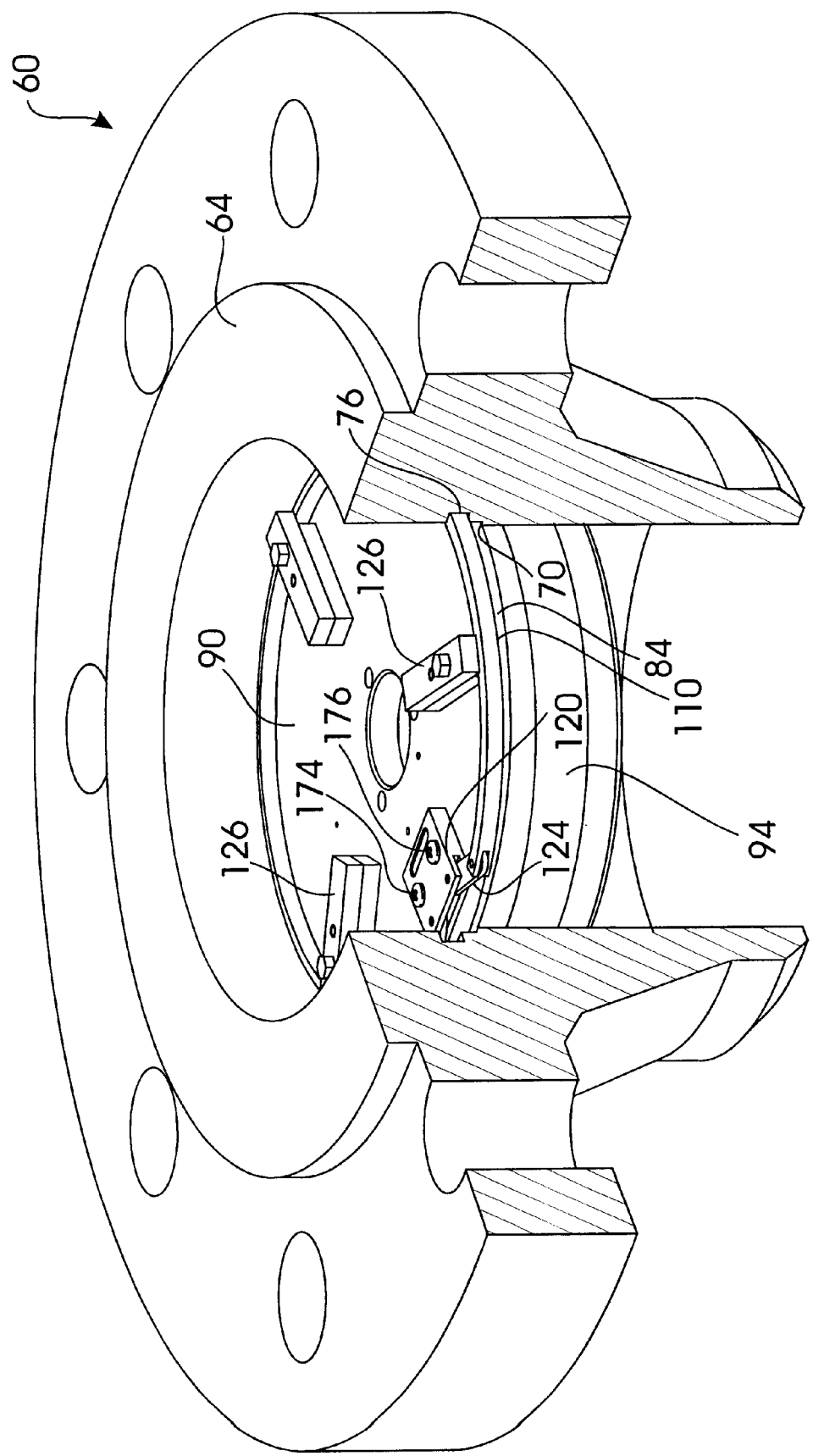
FIG. 9 is an isometric view of a tubular member in the form of a flange as illustrated in FIGS. 3 and 5 and shows the plug inserted into and locked in position within the flange and with the plug holder removed.

Link plate 120 has spaced apart vertical openings 168 and 170 (see FIG. 6). In alignment with openings 168 and 170 when the link plate 120 is radially outwardly positioned, expanding snap ring 110, are threaded openings 172 in plug body top surface 90 as seen in FIG. 8. When plug 78 has been fully installed the installation equipment that is secured to the top surface of flange 60 can be removed and bolts 174 and 176 threaded through openings 168 and 170 to secure link plate 120 in its fully forward position. Openings 168 and 170 in link plate 120 are illustrated as being round to receive bolts 174 and 176 only when link plate 120 is fully advanced, that is, when snap ring 110 is in position within circumferential groove 76. Instead of being round, openings 168 and 170 can be keyhole shaped so that bolts 174 and 176 can at all relevant times be mounted in threaded openings 172 in plug body top surface 90. Such keyhole shaped slots allow the link plate to slide with respect to the bolts but when the snap ring is extended into the circumferential groove a workman can then fully downwardly advance bolts 174 and 176 to securely lock link plate 120 to the plug body top surface 90 and thereby securely lock the snap ring in the circumferential groove. Thereafter, plug holder 132, including stem 158 and safety lock 160 can be removed as a unit by removing screws 134. Snap ring 110 is then held in its fully expanded position. The appearance of the plug after it has been firmly seated in flange 60 and the plug holder 132 removed is seen in FIG. 9. The passageway through the plug body 86 is closed by ball valve 104 urged into seating position by spring 106, these components being seen in FIG. 4. In the condition as seen in FIG. 9 a blind flange or cover plate can be placed over the outer end 64 of flange 60 to seal the flange against any possibility of leakage past elastomeric toroid 94.

During installation of plug 78 while the pipeline or other apparatus to which flange 60 is attached is under pressure and before completion of the plugging operation, bolts 174 and 176 are not employed. Instead, a first shear pin 180 (see FIG. 8) loaded by a spring 182 is positioned within a first vertical opening 184 in the base of plug holder body 136. Pin 180 extends through a first opening 186 in yoke 144 when the yoke is fully advanced, that is, when the snap ring is fully expanded. A second shear pin loaded by a spring (not separately illustrated but visually the same as shear pin 180 and spring 182 in FIG. 8) is positioned within a second vertical opening 188 in plug holder body 136. This second shear pin extends through a second opening 190 in yoke 144 when the yoke is fully retracted, that is, when the snap ring is fully reduced in diameter. The shear pins are severable by torque applied by an operator to cam-shaft 140. The shear pins provide information to an operator as to the position of the lock ring, that is, when it is fully expanded or fully contracted.

While the removable closure system of the second embodiment has been described as it is particularly relevant to closing a flange that is used for providing access to a pipeline or other system under pressure, commonly referred to in the industry as "hot tapping", nevertheless, the closure system as described herein have other applications.

An alternate and further improved embodiment of the invention is illustrated in FIGS. 10–17 wherein numerals indicating elements of the illustrated structure that have essentially the same shape and function as elements in the embodiment illustrated in FIGS. 1–9 are the same. In the embodiment of FIGS. 10–17 an element that has essentially the same function but that is slightly different in configuration than that as illustrated in FIGS. 1–9 is identified with the same numeral but with a suffix of the letter "A". In the embodiment of FIGS. 10–17 the plug body has a top surface 90 and a outer circumferential surface that includes external cylindrical surfaces 80 and 82, a circumferential groove 92 and an elastomeric toroid 94, all as previously described with reference lo the earlier illustrated embodiments. To install or remove the plug member from a flange (the flange being identified by the numeral 60 in FIGS. 12, 13 and 14) a plug holder 132. The plug holder has been previously described, the plug holder being removably secured to upper surface 90 of the removable plug member by bolts 134.

Figure 10:
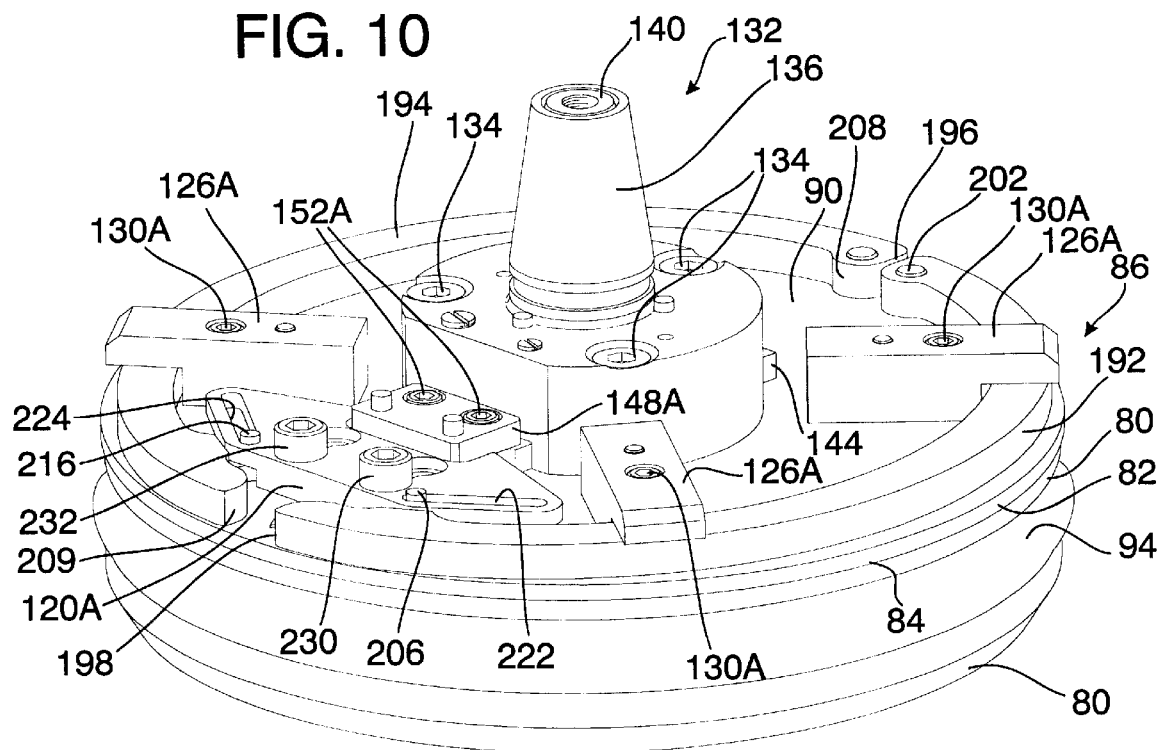
FIG. 10 is an isometric view of an improved plug member removably insertable into a flange of the type as illustrated in FIGS. 3 and 5.
Figure 11:
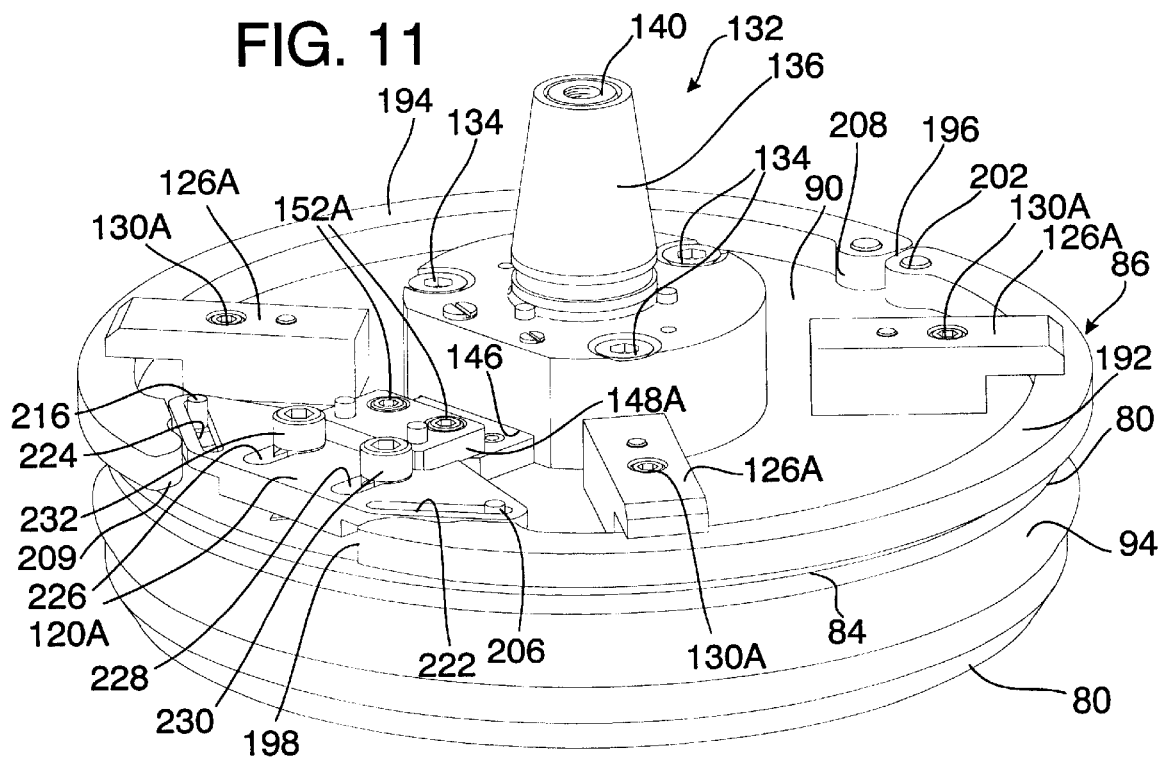
FIG. 11 is the improved plug member as shown in FIG. 10 but showing the first and second retainer leaves radially outwardly expanded as occurs when the plug member is in locked position within a flange.
Figure 15:
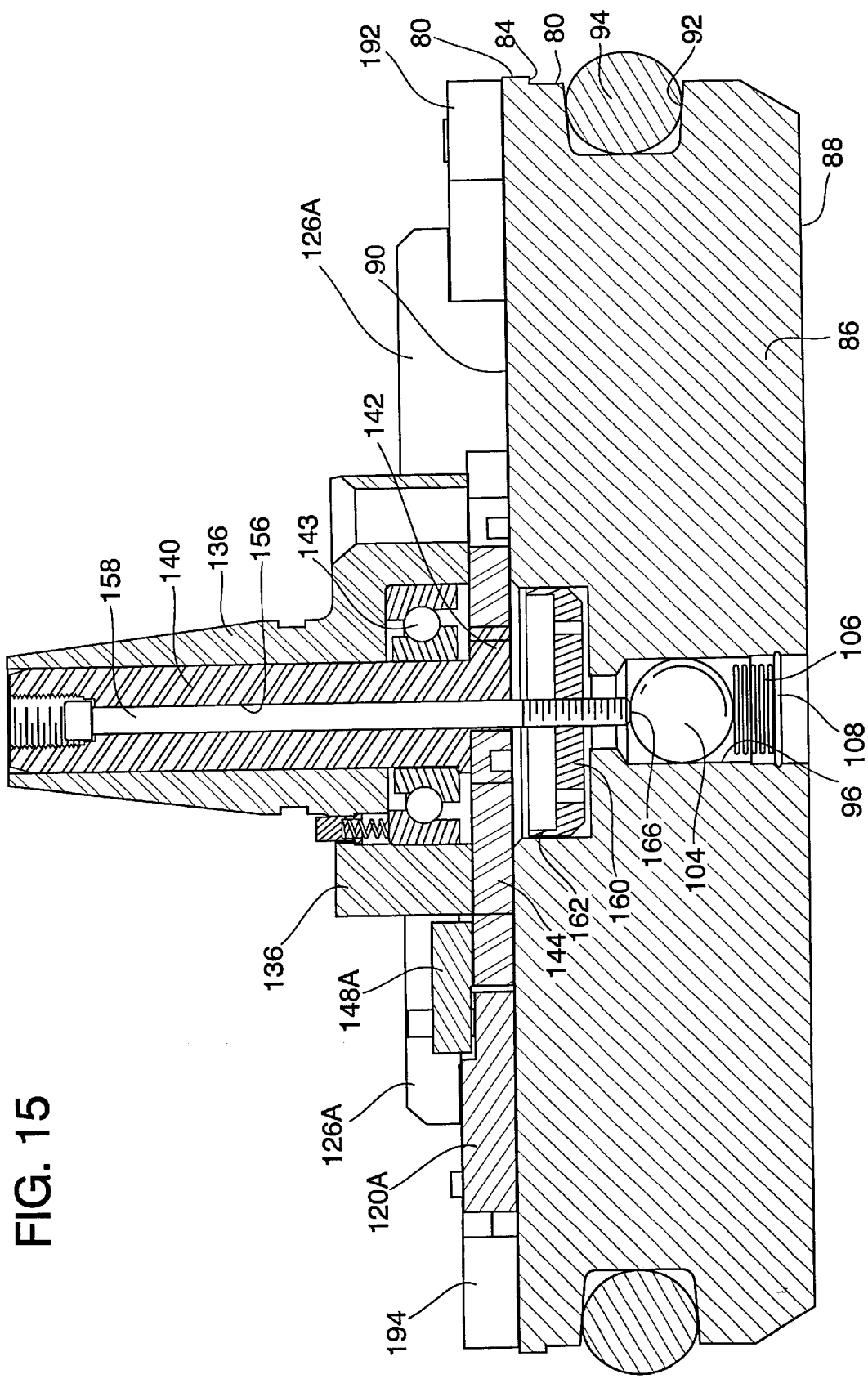
FIG. 15 is an enlarged cross-sectional view of the removable plug member with the plug holder attached and shows a type of pressure relief mechanism that employs a ball valve arrangement.
Figure 16:
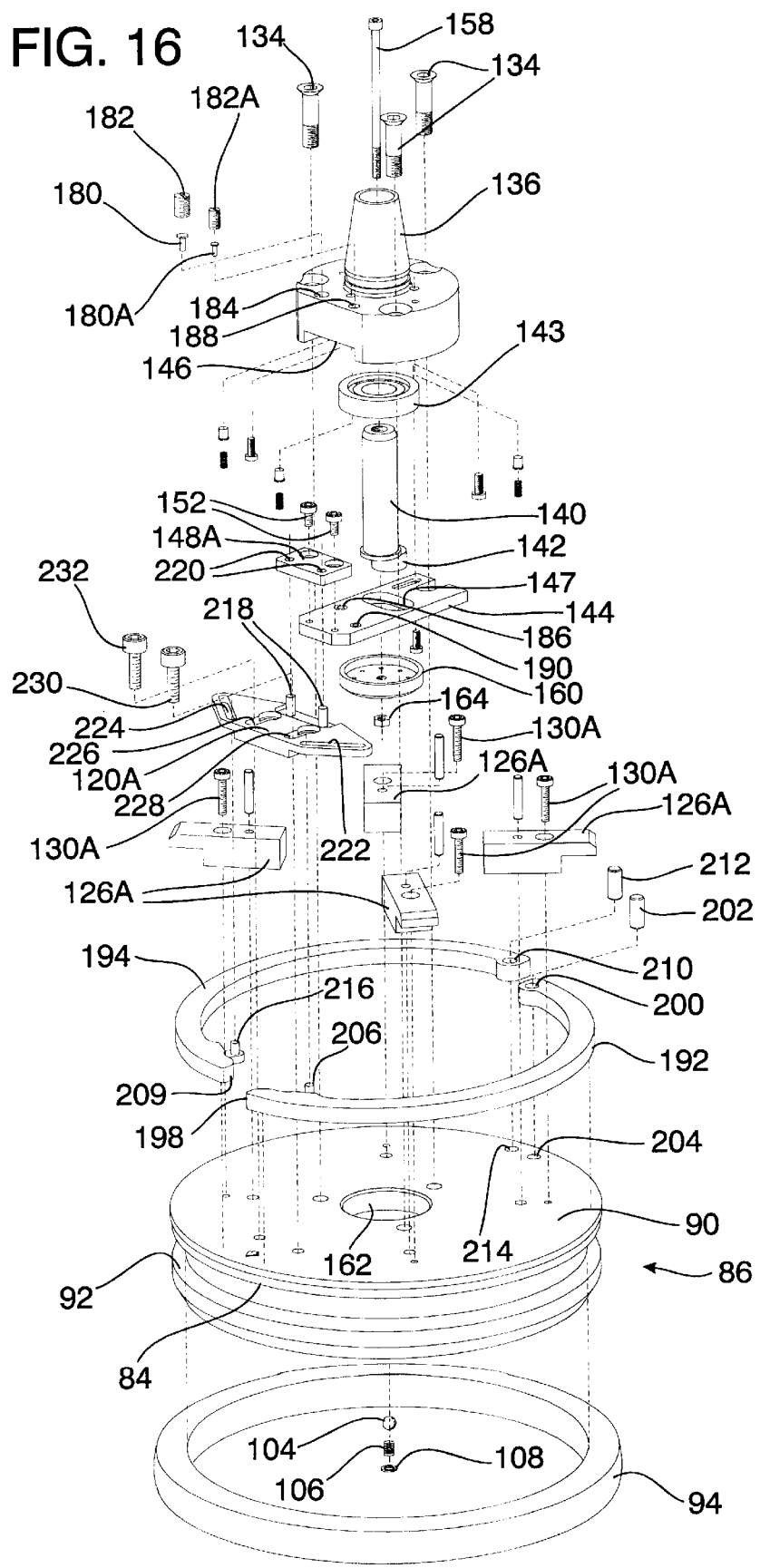
FIG. 16 is an exploded view of the removable plug and plug holder.

A basic difference between the embodiment of FIGS. 10–17 compared to the earlier described embodiment, is in the configuration of the snap ring. In the earlier described embodiment snap ring 110 is a unitary member that is radially outwardly expandable into a circumferential slot in a flange. In the new embodiment, a unitary snap ring is not employed but instead, a first retainer leaf 192 and a second retainer leaf 194. Retainer leaves 192 and 194 together function to accomplish the same purpose as snap ring 110 as previously described. As illustrated in FIGS. 10, 11 and 16, the first retainer leaf 192 has a first end 196 and a second end 198. Adjacent first end 196 is an opening 200 as seen in FIGS. 16 that receives a pin 202 that extends into an opening 204 in the top surface 90 of plug body 86. Adjacent the second end 198 of first retainer leaf 192 is an upwardly extending pin 206.

In like manner, second retainer leaf 194 has a first end 208 and a second end 209. Adjacent the first end 208 is an opening 210 (see FIG. 16) that receives a pin 212 that extends within an opening 214 in top surface 90 of plug body 86. Further, an upwardly extending pin 216 is secured to second retainer leaf 194 adjacent the second end 209.

Retainer leaves 192 and 194 can pivot towards and away from each other around hinge pins 202 and 212 and are retained in sliding position by guides 126A, each of the guides being held in position on plug member top surface 90 by a bolt 130A.

Plug holder 132 rotatably receives a camshaft 140 (best seen in FIG. 16) the camshaft having on the lower end thereof a cam portion 142. Slidably positioned on the top surface 90 of plug body 86 is a yoke 144 having an elongated slot 147 therein that receives cam portion 142. As camshaft 140 is rotated yoke 144 is reciprocally displaced radially inwardly and outwardly as guided by a slot 146 in the bottom of holder body 136.

Radially positioned by yoke 144 is a link plate 120A. Specifically, link plate 120A has upwardly extending pins 218 that are received in openings 220 in a linkage member 148A. Linkage member 148A is secured to the outer end of yoke 144 by means of bolts 152A. Thus by means of linkage member 148A, link plate 120A is moved inwardly and outwardly on upper surface 90 of plug body 86 as camshaft 140 is rotated.

Figure 12:
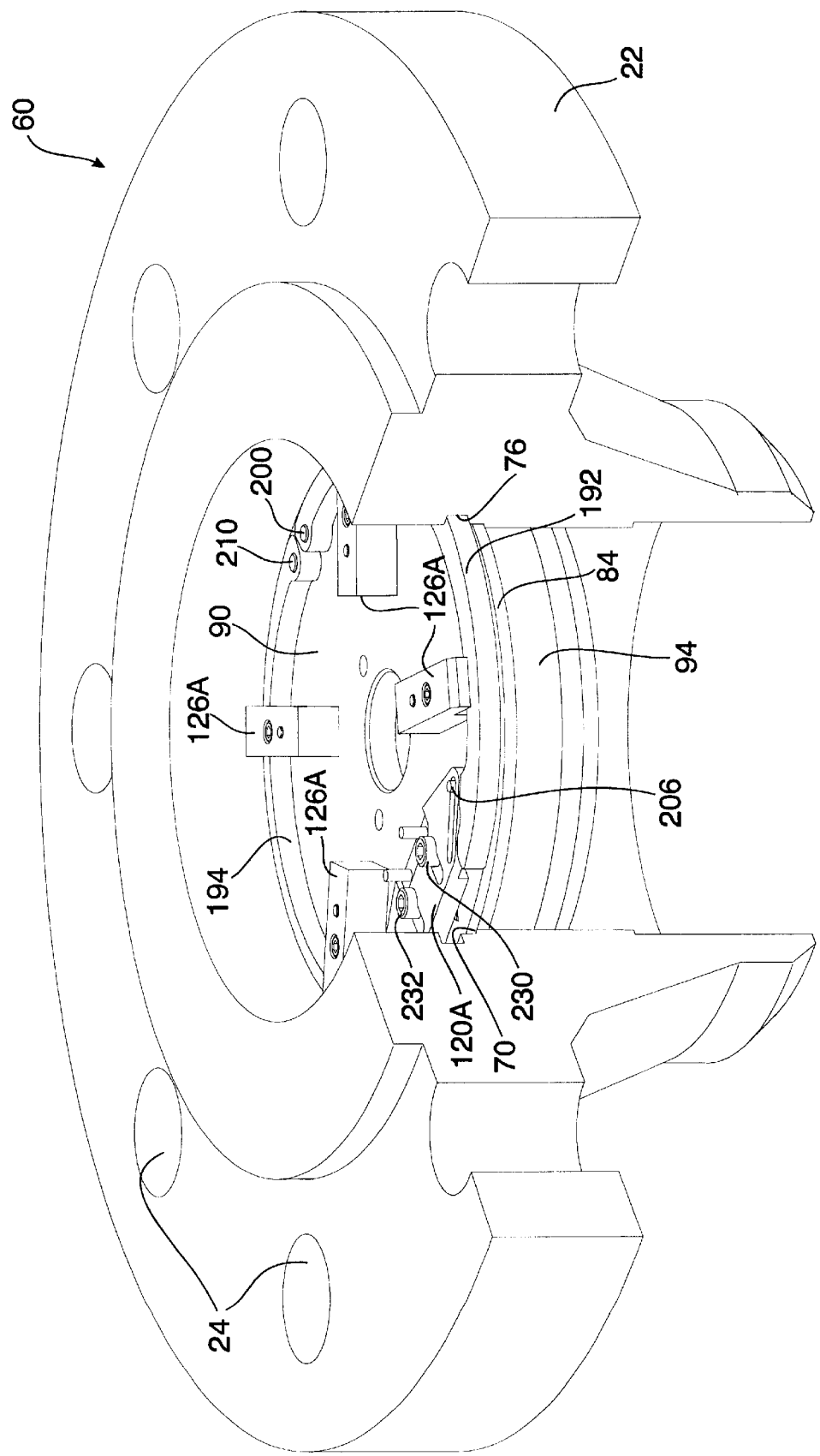
FIG. 12 is an isometric view of a flange of the type illustrated in FIGS. 3 and 5 shown partially cut-away and showing the improved plug member of FIGS. 10 and 11 positioned into and locked in place within the flange.
Figure 13:
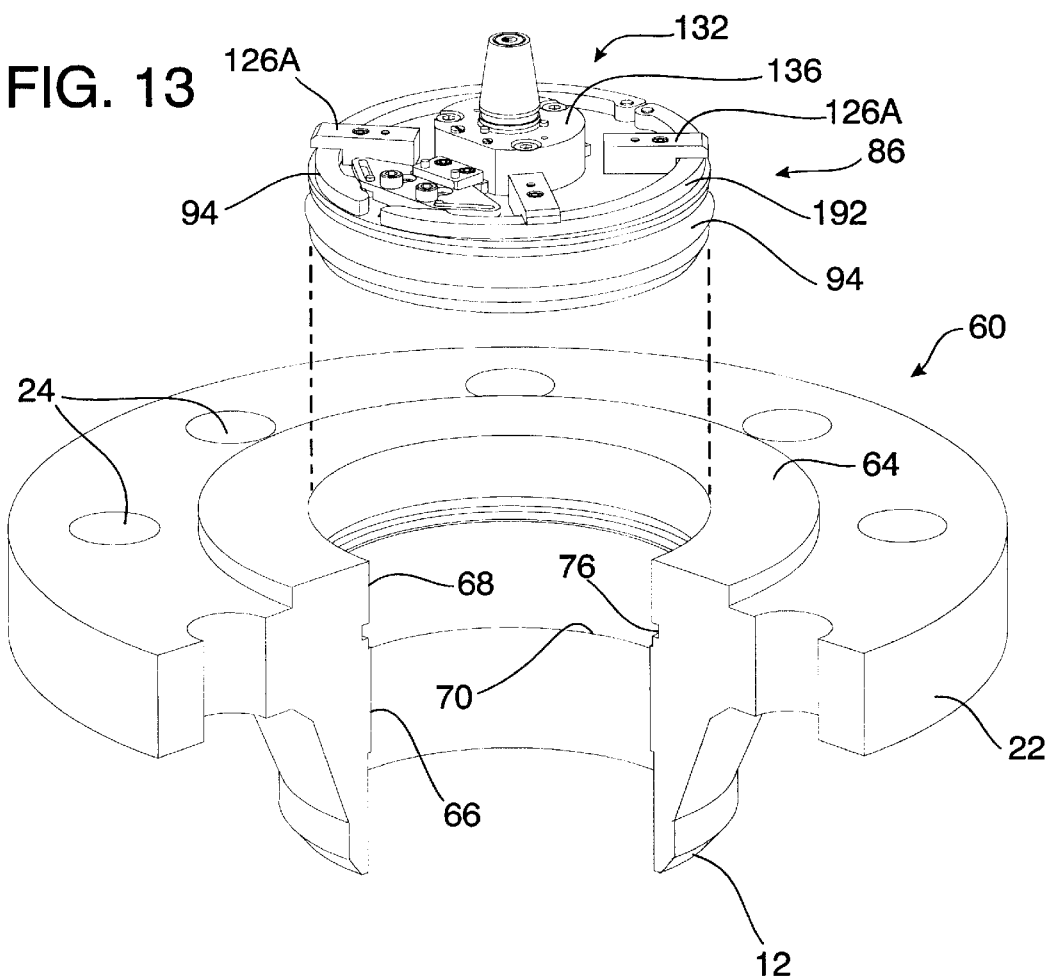
FIG. 13 is an exploded view showing the relationship between a flange, isometrically illustrated and cut-away, and the plug member of FIGS. 10 and 11 as the plug member is inserted into or removed from the flange.
Figure 14:
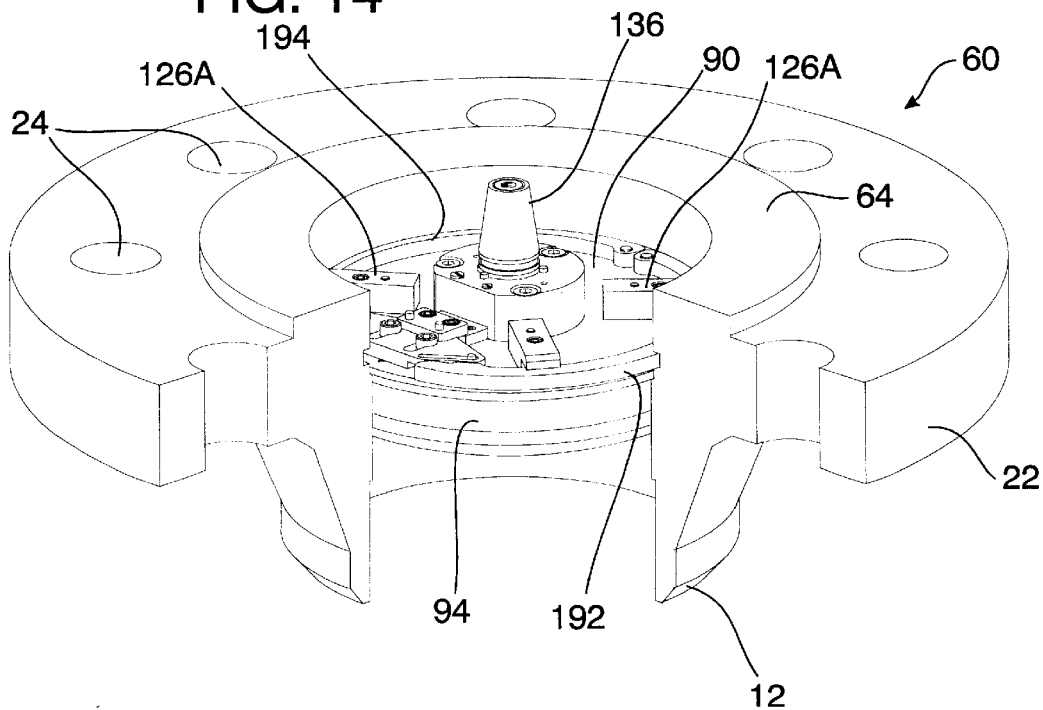

Formed in link plate 120A are first and second elongated slots 222 and 224. Slot 222 slidably receives pin 206 affixed adjacent the second end of first retainer leaf 192 and slot 224 slidably receiving pin 216 affixed adjacent the second end of the second retainer leaf 194. By the connection of pins 206 and 216 to link plate 120A, the rotation of camshaft 140 radially outwardly expands retainer leaves 192 and 194 or radially inwardly contracts the leaves. FIG. 10 shows link plate 120A radially inwardly positioned so that leaves 192 and 194 are radially and inwardly retracted in which case all portions of the leaves are internal of the plug body external cylindrical surface 82. In the condition shown in FIG. 10, the plug body can be inserted into or removed from the interior of flange 60. FIG. 11 shows link plate 120A radially outwardly positioned, outwardly expanding leaves 192 and 194 to extend beyond circumferential surface 82 of plug body 86 so that when the plug body is positioned within flange 60 the leaves extend into circumferential groove 76 as shown in FIG. 12.

To radially guide link plate 120A opposed parallel slots 226 and 228 are provided. These slots receiving bolts 230 and 232. Slots 226 and 228 are provided with enlarged area recesses adjacent their inner ends as seen in FIGS. 10 and 16. When the link plate 120A is radially outwardly expanded to the maximum position as illustrated in FIG. 11, which is the condition in which the plug body 86 is in locked position within a flange, bolts 230 and 232 may be downwardly threaded so that the enlarged heads thereof enter into the enlarged recesses in slots 226 and 228 thereby locking link plate 120A in its outward position and correspondingly locking retainer leaves 192 and 194 in their radially outwardly expanded positions. After a plug body 86 has been inserted into a flange 60 and leaves 192 and 194 radially outwardly expanded, plug holder 132 can be removed from top surface 90 of the plug body as has been previously described with reference to the embodiment of FIGS. 3–9.

Figure 17:
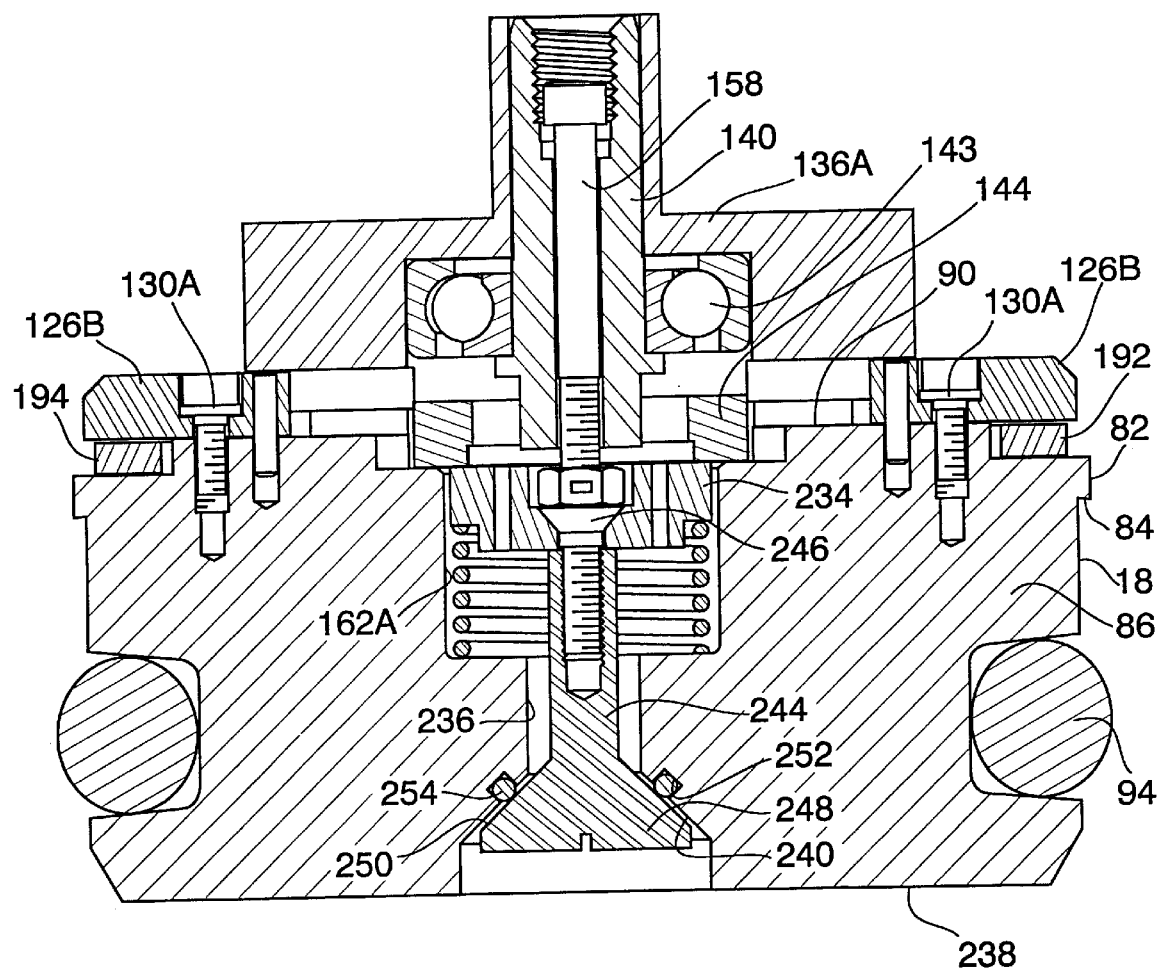
FIG. 17 is a cross-sectional view of a smaller diameter removable plug member showing a different configuration of the pressure relief system.

Before a plug member that has been locked in position within a flange is removed it is important that any pressure applied against the plug member from within the system to which the flange is attached is relieved otherwise, after the retainer leaves 192 and 194 have been retracted the plug could blow out and injure a workman. The method of relieving pressure through the plug member has heretofore been described with reference to FIG. 4. The same system employing the same elements is utilized in the new embodiment of the invention as best illustrated in FIG. 15. FIG. 17 shows an alternate embodiment of a pressure relief system that is preferred for use on smaller plug members. In the embodiment of FIG. 17, plug body 86 has a larger diameter opening 162A that communicates with top surface 90 and that receives a cylindrical guide member 234. The plug body has a reduced diameter opening 236 extending downwardly towards a bottom surface 238 of the plug member. Reduced opening 236 is flared out into a frusto-conical opening 240 that communicates with a cylindrical lower opening 242. A valve element has a stem portion 244 that is co-axially affixed to the bottom surface of guide 234 by a bolt 246. Stem portion 244 integrally connects with a valve head portion 248 that has a frusto-conical valve sealing surface 250. Received in frusto-conical surface 240 is a circumferential groove 252 that receives an O-ring 254.

Yoke 144 has a cylindrical recess 256 in its lower surface that receives cylindrical guide 234. When yoke 144 is in its outward position with leaves 192 and 194 radially outwardly extended locking the plug body in position in the flange, cylindrical guide 234 enters recess 256 in the bottom of yoke 144 to lock the plug in place. When stem 158 is downwardly depressed, thereby downwardly depressing valve head portion 248, pressure within the flange below plug body 186 is relieved. After the pressure is relieved the operator is aware that camshaft 140 may be rotated to retract leaves 192 and 194 to permit the removal of a plug. Thus, in essence the pressure release system of FIG. 17 functions in the same way as the pressure relief system of FIG. 15 except for the configuration of the valving elements that control the release of pressure below the plug body.

As has been previously described, shear pins 180 and 180A (see upper portion of FIG. 16) that extend through openings 84 and 88 in holder body 136 can, when downwardly extended, enter openings 186 and 190 in yoke 144. Shear pin 180 is received in opening 186 to lock yoke 144 in its outward position—that is, to lock the yoke when leaves 192 and 194 are radially outwardly expanded while shear pin 180A functions to lock the yoke in the collapsed position in which the leaves are radially inwardly expanded. The shear pins can be sheared by forced rotation of camshaft 140. The shear pins serve to provide information to the operator that action of the camshaft and thereby yoke 144 has taken place to either move the yoke to the leaves retracted position or the leaves expanded position.

The embodiment of FIGS. 10–17 functions essentially the same as the embodiment of FIGS. 4–9 however, in the latter embodiment the movement of retainer leaves 192 and 194 is positive—that is, the leaves are fully outwardly expanded or fully inwardly retracted according to the position of camshaft 140 whereas in the earlier embodiment the retraction of snap ring 110 is not as absolutely certain since in some instances it is possible that the rearward portion of snap ring 110—that is, the portion that is opposite ends 116 and 118 of the snap ring of the embodiment of FIGS. 6 and 7 could inadvertently remain within the confines of circumferential groove 76 within the flange 60.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope to which each element thereof is entitled.

What is claimed:

1. A removable closure comprising:
    a tubular member having an inner end and an outer end, and an internal cylindrical surface defined by a first surface adjacent said inner end of a first internal diameter and a second surface adjacent the first surface of an enlarged internal diameter providing a circumferential ledge, and, in the second surface an increased internal diameter circumferential slot;
    a cylindrical plug of external diameter greater than the internal diameter of said tubular member first cylindrical surface and slightly less than said second cylindrical surface, the cylindrical plug being telescopically positionable within said tubular member second internal cylindrical surface and in engagement with said tubular member circumferential ledge;
    an expandable snap ring having a collapsed and an expanded condition and when in the collapsed condition having an external diameter less than said tubular member second internal diameter and in the expanded condition of diameter greater than said tubular member second internal diameter, the snap ring having a cross-section configuration dimensioned so that it is removably receivable in said expanded condition within said tubular member circumferential slot, and when in said circumferential slot having an internal diameter that is, at least in part, less than said tubular member second internal diameter whereby when the snap ring is in expanded position within said slot said plug is captured between said circumferential ledge and the snap ring; and
    linkage mechanism engaged with said snap ring and moveable between a first position and a second position, in the linkage mechanism first position said snap ring is radially inwardly collapsed and of external diameter less than said tubular member second cylindrical surface and in the linkage mechanism second position said snap ring is radially outwardly expanded and partially received in said tubular member circumferential groove.

2. A removable closure system according to claim 1 wherein said snap ring is a unitary circumferential member having opposed, spaced apart first and second ends and wherein said snap ring is radially inwardly collapsed by said first and second ends moving towards each other.

3. A removable closure system according to claim 1 wherein said snap ring is formed of a first and a second leaf portion, each portion having a first end and a second end, each leaf portion being hinged to said plug body adjacent said first end thereof, said linkage mechanism being secured to said first and second leaf portions adjacent said second end thereof.

4. A removable closure according to claim 1 wherein said tubular member is a flange member having an integral external flange portion.

5. A removable closure according to claim 1 including an attachment to maintain said snap ring in said expanded condition.

6. A removable closure system according to claim 1 wherein said attachment is in the form of a bolt extendable through an opening in said linkage mechanism.

7. A removable closure system according to claim 1 wherein said linkage mechanism is supported substantially in a plane of and within said snap ring and is displaced radially inwardly to collapse said snap ring and is displaced radially outwardly to expand said snap ring.

8. A removable closure system according to claim 1 wherein said cylindrical plug has in an upper surface and including a plug holder assembly removably attachable to said cylindrical plug upper surface, the plug holder having a rotatable cam-shaft connected to said linkage mechanism whereby said snap ring can be expanded or contracted by rotation of said rotatable shaft.

9. A removable closure system according to claim 8 wherein said linkage system include a yoke having a longitudinal slot paralleled to said cylindrical plug upper surface; and including an eccentric cam affixed to said rotatable shaft and received within said longitudinal slot in said yoke, the rotation of said rotatable shaft and thereby the rotation of said eccentric cam serving to radially displace said yoke to expand or contract said snap ring.

10. A removable closure system according to claim 2 wherein said unitary snap ring has a gap therein providing said opposed snap ring first and second ends and wherein said unitary snap ring is collapsible by inward force applied simultaneously to said opposed snap ring first and second ends to move said first and second ends towards each other and is expandable by outward force applied simultaneously to said opposed snap ring first and second ends to move said first and second ends away from each other.

11. A removable closure system according to claim 10 wherein said linkage mechanism includes a first link connected to said unitary snap ring first end and a second link connected to said unitary snap ring second end, said first and second links being connected to a link plate, said link plate, said first and second links and said snap ring being at least substantially in a common plane.

12. A removable closure system according to claim 1 wherein said cylindrical plug has an upper surface and wherein said snap ring and said linkage mechanism are movably positionable on said cylindrical plug upper surface.

13. A removable closure system according to claim 12 including a plurality of guides supported to said cylindrical plug upper surface, each guide having a portion loosely overlying said snap ring and servicing to retain said snap ring in position on said cylindrical plug upper surface while permitting radially inwardly and outward contraction and expansion of said snap ring.

14. A removable closure system according to claim 1 wherein said cylindrical plug has a bypass opening therethrough and including:

a valve in said bypass opening biased to a closed position normally preventing the passage of fluid therethrough, the valve being displacable to an open position by downward mechanical force applied through said bypass opening.

15. A removable closure system according to claim 1 wherein said cylindrical plug external cylindrical surface has a circumferential groove therein; and an elastomeric toroidal member received in said cylindrical plug circumferential groove and engage said tubular member first internal surface.

16. A closure removably positionable in a cylindrical opening, the cylindrical opening having a circumferential slot therein, comprising:

a plug body having an external surface and being removably and sealably receivable within a cylindrical opening;

a first and a second retainer leaf each having an outer substantially semi-cylindrical edge and each having opposed first and second end portions, a first end portion of each of said retainer leaves being pivotally secured to said plug body permitting each said retaining leaf to be pivoted between a retracted position in which said outer edge of each retainer leaf is substantially even with or within said plug body cylindrical surface and an expanded position in which said outer edge of each said retainer leaf is beyond said plug body cylindrical surface and receivable within a cylindrical slot of a cylindrical opening; and an operator for pivoting said retainer leaves between said retracted and expanded positions.

17. A closure according to claim 16 in which said operator is in the form of a yoke member radially positionable with respect to said plug body.

18. A closure according to claim 17 in which said yoke has an outer end portion and an inner end portion and has a transverse slot therein adjacent said inner end portion, the transverse slot receiving an eccentric cam portion that is affixed to a rotatable shaft, the yoke being radially positioned by the rotation of said shaft.

19. A closure according to claim 17 wherein said yoke has an outer end portion and wherein said yoke is interconnected to said second end portion of each of said retainer leaves by an elongated slot/pin interrelationship.

20. A closure according to claim 19 in which said yoke has opposed angular slots in said outer end portion and each said retainer leaf has a pin slidably receivable in a said angular slot in said yoke outer end portion.

* * * * *